United States Patent [19]
Ukai et al.

[11] Patent Number: 5,121,236
[45] Date of Patent: Jun. 9, 1992

[54] LIQUID CRYSTAL DISPLAY ELEMENT AND METHOD FOR TREATING DEFECTIVE PIXELS THEREIN

[75] Inventors: Yasuhiro Ukai, Kobe; Tomihisa Sunata, Miki; Teizou Yukawa, Kobe, all of Japan

[73] Assignee: Hosiden Corporation, Osaka, Japan

[21] Appl. No.: 695,912

[22] Filed: May 6, 1991

[30] Foreign Application Priority Data

May 16, 1990 [JP] Japan .................. 2-126280

[51] Int. Cl.⁵ .......................... G02F 1/1343
[52] U.S. Cl. ...................... 359/59; 359/87; 357/23.7
[58] Field of Search ........... 350/333, 334, 332, 331 R, 350/351; 340/784; 357/23.7; 359/544 S, 584 S, 594 S, 874 S

[56] References Cited

U.S. PATENT DOCUMENTS

| | | | |
|---|---|---|---|
| 4,368,523 | 1/1983 | Kawate | 350/333 X |
| 4,630,893 | 12/1986 | Credelle et al. | 350/334 |
| 4,666,252 | 5/1987 | Yaniu et al. | 350/333 |
| 4,761,058 | 8/1988 | Okubo et al. | 350/331 T |
| 4,890,097 | 12/1989 | Yamashita et al. | 350/332 X |
| 4,936,656 | 6/1990 | Yamashita et al. | 350/333 |

FOREIGN PATENT DOCUMENTS

| | | | |
|---|---|---|---|
| 58-159516 | 9/1983 | Japan . | |
| 2055338 | 2/1990 | Japan | 359/59 |
| 2079026 | 3/1990 | Japan | 359/54 |
| 2193121 | 7/1990 | Japan | 359/59 |

Primary Examiner—Stanley D. Miller
Assistant Examiner—Ron Trice
Attorney, Agent, or Firm—Pollock, Vande Sande and Priddy

[57] ABSTRACT

In an active liquid crystal display element which operates in a normally white mode, there is formed a shorting metal layer which overlaps each pixel electrode and a source bus adjacent thereto. In those portions of the pixel electrode and the source bus overlapping the shorting metal layer there are formed weld metal layers. The pixel electrode of a defective pixel is connected to the corresponding source bus by welding the weld metal layers and the shorting metal layer through irradiation with laser beams to the above-mentioned overlapping portions. As a result of this, the defective pixel becomes a black defect when the liquid crystal display element operates.

17 Claims, 8 Drawing Sheets

LIQUID CRYSTAL DISPLAY ELEMENT AND METHOD FOR TREATING DEFECTIVE PIXELS THEREIN

BACKGROUND OF THE INVENTION

The present invention relates to a normally white mode active liquid crystal display element which is transparent when no voltage is applied to its liquid crystal and a method for treating its defective pixels.

Figure 1:
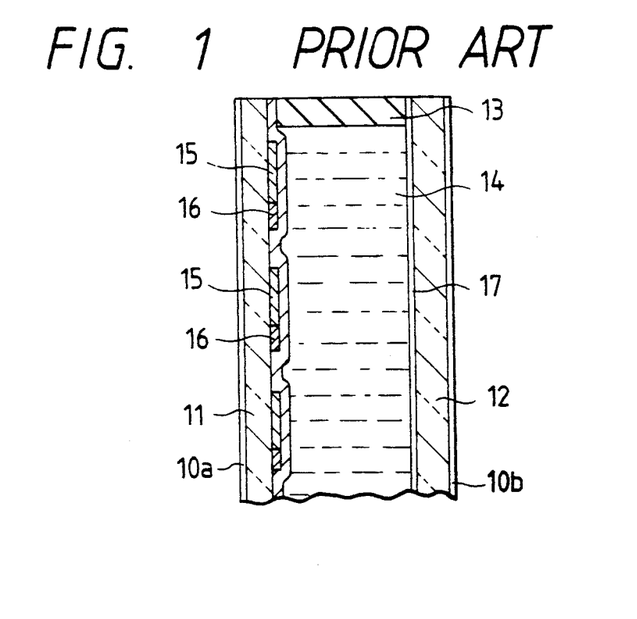
FIG. 1 is a sectional view showing a portion of a conventional liquid crystal display element.

A description will be given first, with reference to FIG. 1, of a conventional liquid crystal display element, in which liquid crystal 14 is sealed in a space defined by a pair of opposed transparent base plates 11 and 12 as of glass with a spacer 13 interposed therebetween along their marginal portions. On the inside of the one transparent base plate 11 there are formed a plurality of pixel electrodes 15 and thin film transistors (hereinafter referred to as TFTs) 16 which are disposed adjacent to the pixel electrodes 15, respectively, and serve as switching elements. Each TFT 16 has its drain connected to the corresponding pixel electrode 15. On the inside of the other transparent base plate 12 there is formed a transparent common electrode 17 in opposed relation to the plurality of pixel electrodes 15. The transparent base plates 11 and 12 are deposited all over their exterior surfaces with polarizing films 10a and 10b, respectively. For example, in the case where the liquid crystal 14 is a 90° twist nematic liquid crystal, the polarizing films 10a and 10b are disposed with their directions of polarization held at right angles to each other, for instance. With such an arrangement of the polarizing films 10a and 10b, when no voltage is applied to the liquid crystal 14, light having passed through the one polarizing film undergoes a 90° rotation in its direction of polarization during the passage through the liquid crystal 14 and is allowed to pass through the other polarizing film, whereas when a voltage is being applied to the liquid crystal 14, the light does not undergo such a 90° rotation in its direction of polarization and is intercepted by the other polarizing film. That is, the display element operates as a normally white mode element in this instance. Incidentally, when the polarizing films 10a and 10b are arranged with their directions of polarization held in parallel to each other, the display element will operate as a normally black mode element. In the case of a reflecting type display element, the exterior surface of the base plate 11 is coated with a reflecting metallic film in place of the polarizing film 10a.

Figure 2:
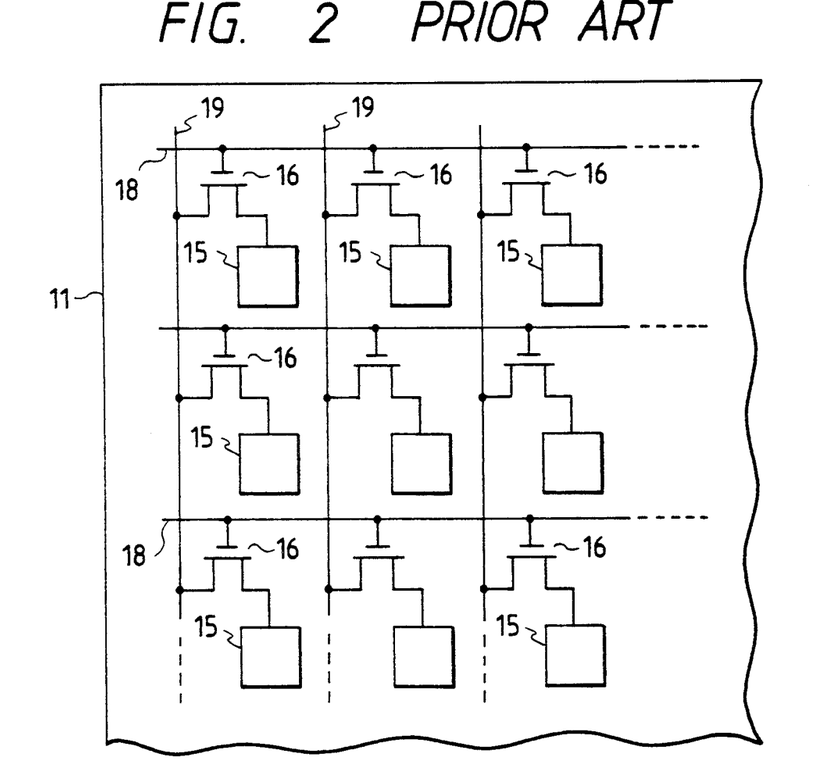
FIG. 2 is a circuit diagram showing the arrangement of pixel electrodes and TFT's connected thereto in the conventional liquid crystal display element.

As shown in FIG. 2, the pixel electrodes 15, substantially square in shape, are closely arranged in rows and columns on the transparent base plate 11. A gate bus 18 is formed adjacent to and extends along each row of the pixel electrodes 15 and a source bus 19 is similarly formed adjacent to and extends along each column of the pixel electrodes 15. The TFTs 16 are each disposed at or near the intersection of the gate and source buses 18 and 19. The TFTs 16 in each row have their gates connected to the corresponding gate bus 18 and the TFTs 16 in each column have their sources connected to the corresponding source bus 19. The TFTs 16 have their drains connected to the pixel electrodes 15 corresponding to them, respectively.

By applying a voltage across selected ones of the gate and source buses 18 and 19, only the TFT 16 supplied with the voltage conducts to store charges in the pixel electrode 15 connected to the drain of the conducting TFT 16 and then a voltage is applied across only that portion of the liquid crystal 14 between the pixel electrode 15 and the common electrode 17, thereby making that pixel of the liquid crystal display transparent or opaque to provide a selective display. The display can be erased by discharging the charges stored in the pixel electrode 15.

Figure 3:
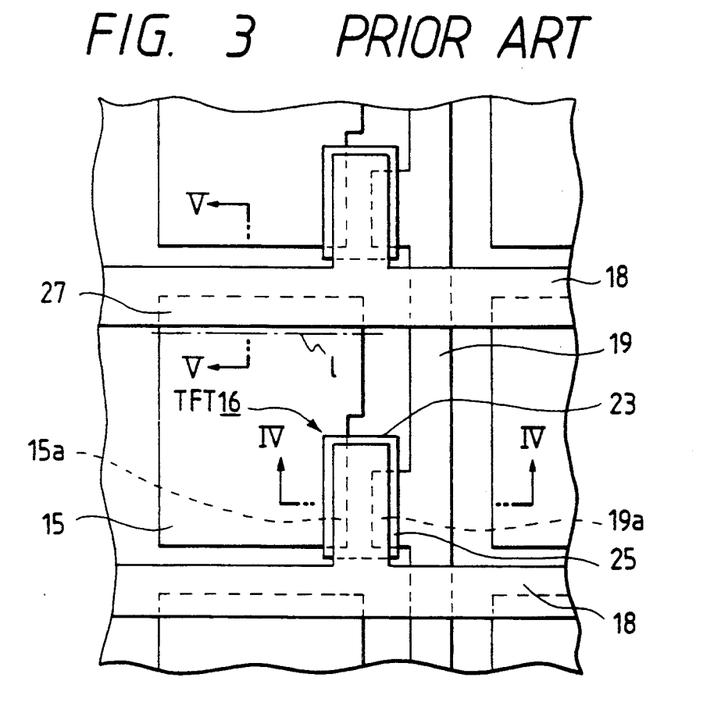
FIG. 3 is a plan view showing one pixel and its vicinity in the conventional liquid crystal display element.
Figure 4:
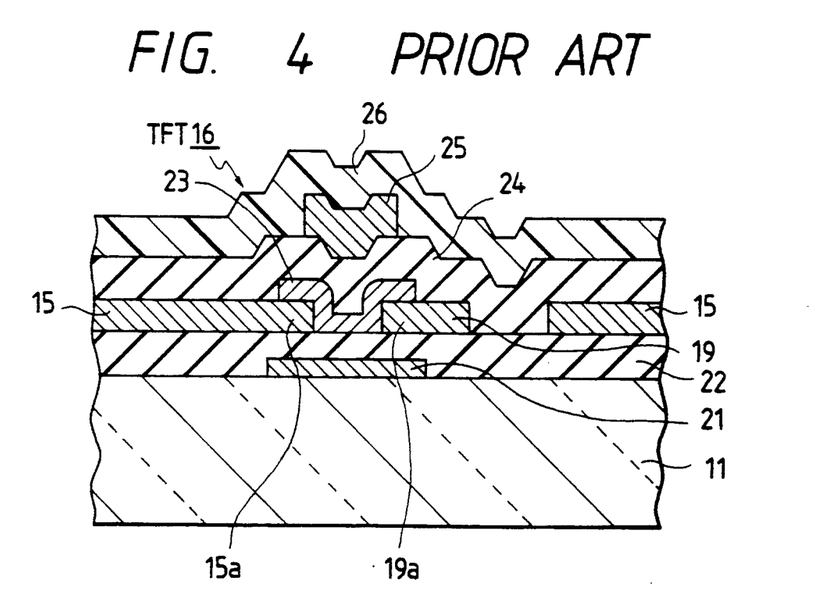
FIG. 4 is a sectional view taken on the line IV—IV in FIG. 3.

The TFT 16 has such a construction as shown in FIG. 4 which is a sectional view taken on the line IV—IV in FIG. 3. A light shield 21 is formed of a light intercepting metal such as chromium or molybdenum on the transparent base plate 11 at the position corresponding to the TFT 16 and an insulating layer 22 is formed all over the transparent base plate 11, covering the light shield 21. On the insulating layer 22 the pixel electrode 15 and the source bus 19 are each formed by a transparent electrode film as of ITO (i.e. indium-tin oxide). A semiconductor layer 23 as of amorphous silicon is formed, filling the gap between parallel-opposed portions of the pixel electrode 15 and the source bus 19. The semiconductor layer 23 is covered with a gate insulating film 24 as of silicon nitride. A gate electrode 25 is formed on the gate insulating film 24 in opposed relation to the semiconductor layer 23, one end of the gate electrode 25 being connected to the gate bus 18. Those portions of the pixel electrode 15 and the source bus 19 which are in contact with the semiconductor layer 23 constitute a drain electrode 15a and a source electrode 19a, respectively. The electrodes 15a and 19a, the semiconductor layer 23, the gate insulating film 24 and the gate electrode 25 make up each TFT 16. The gate electrode 25 and the gate bus 18 are simultaneously formed of, for example, aluminum. To safeguard the liquid crystal 14, a passivation layer 26 is coated almost all over the transparent base plate 11, covering the gate electrode 25. The light shield 21 is to prevent light from incidence to the semiconductor layer 23 which otherwise produces a photoelectric effect.

Figure 5:
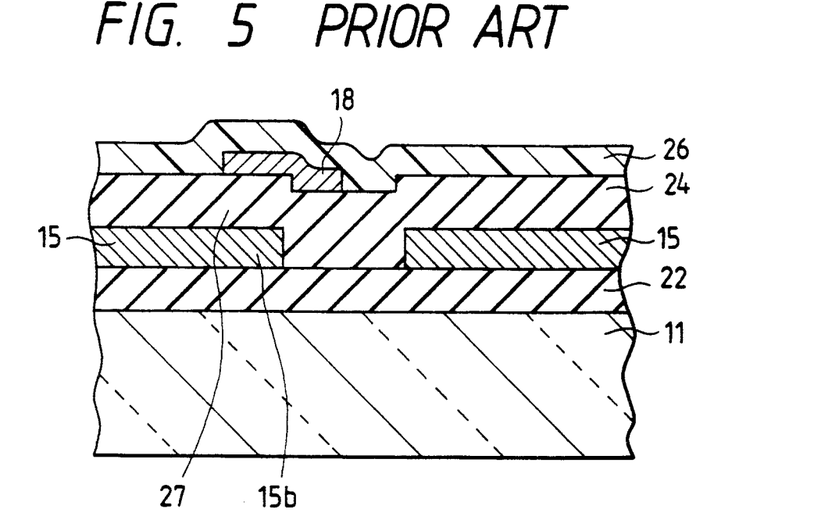
FIG. 5 is a sectional view taken on the line V—V in FIG. 3.

As shown in FIG. 5 which is a sectional view taken on the line V—V in FIG. 3, one end portion of the pixel electrode 15 is extended below the adjoining gate bus 18 to substantially the intermediate portion thereof to form an extended portion 15b, providing a capacitive portion 27 in the gate insulating film 24 between the extended portion 15b and the gate bus 18. The capacitance of the capacitive portion 27 supplements the electrostatic capacitance of the pixel electrode 15 and is effective in providing a large time constant in combination with the resistance value of a channel portion of the TFT 16.

In such an active liquid crystal display element of the type in which the pixels are transparent when no voltage is applied across the pixel electrodes 15 and the common electrode 17, that is, in what is called a normally white mode display element, a defective pixel always remains transparent, i.e. forms a white defect, whether or not a voltage is being applied across the corresponding pixel electrode and the common electrode. The white defect is more noticeable than a black defect which always intercepts light, and hence markedly degrades the display. Therefore, defective pixels of even such a number (or density) as to be allowable in a normally black mode liquid crystal display element (in which defective pixels always intercept light and hence remain black) would not be allowable in the normally white mode liquid crystal element, and consequently, the production yield of the normally white mode liquid crystal display element is appreciably low.

SUMMARY OF THE INVENTION

It is therefore an object of the present invention to provide a liquid crystal display element of a construction in which a white defect in the normally white mode liquid crystal display element can be changed to a black defect.

Another object of the present invention is to provide a method for changing such a white defect to a black one.

According to the method of the present invention, a technique of shorting two metal layers through an insulating layer sandwiched therebetween from outside, such as for example, a laser welding technique, is used to connect the pixel electrode of a defective pixel to a bus which can be supplied with a potential different from that applied to the common electrode, thereby changing the defective pixel to a black defect.

According to the liquid crystal display element of an aspect of the present invention, a metal layer for shorting use is formed partly opposite each pixel electrode and the adjoining source bus across an insulating layer and a metal layer for welding use is formed between the metal layer for shorting use and each of the pixel electrode and the source bus. The metal layer for shorting use of a defective pixel is welded by laser welding to the pixel electrode and the source bus corresponding thereto, and consequently, the pixel electrode is connected to the source bus via the metal layer for shorting use. Since the source bus can be supplied with a potential different from that applied to the common electrode, the defective pixel can be made a black defect.

According to the liquid crystal display element of another aspect of the present invention, the pixel electrode of the defective pixel is shorted to a bus which can be supplied with a potential different from that applied to the common electrode and is disconnected from the drain electrode. Thus the defective pixel can be made a black defect.

DESCRIPTION OF THE PREFERRED EMBODIMENTS

Figure 6:
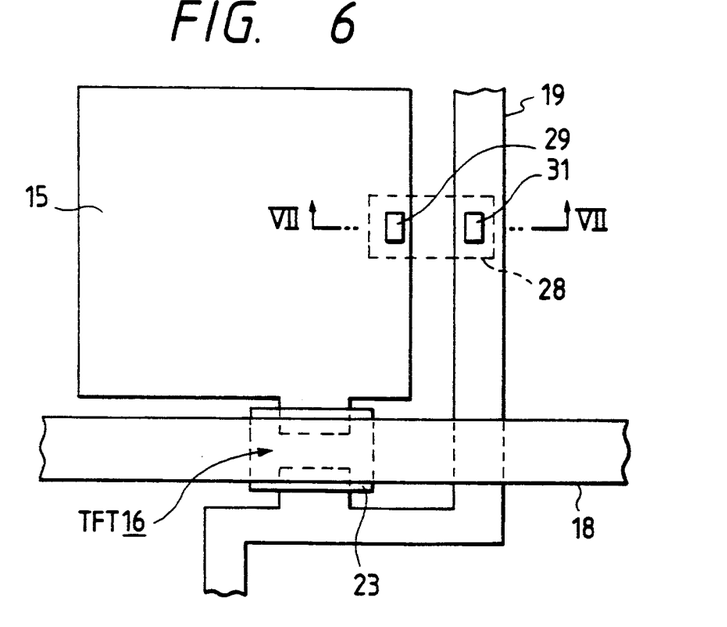
FIG. 6 is a plan view illustrating an embodiment of the present invention.
Figure 7:
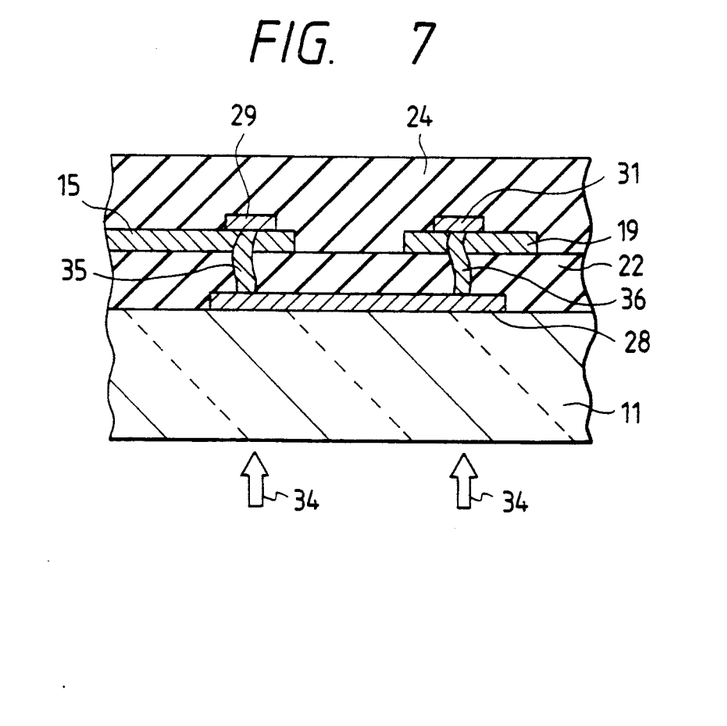
FIG. 7 is a sectional view taken on the line VII—VII in FIG. 6.

FIG. 6 schematically illustrates a portion of an embodiment of the present invention, in which the parts corresponding to those in FIG. 3 are identified by the same reference numerals. In this embodiment the TFT 16 is formed under the gate bus 18 and as a part of it, and at a position apart from the TFT 16, an island-like metal layer for shorting use 28 is formed opposite to a portion of each pixel electrode 15 and the source bus 19 across the insulating layer 22 (also see FIG. 7). Further, island-like metal layers for welding use 29 and 31 are deposited on those portional areas of the pixel electrode 15 and the source bus 19 opposing the metal layer 28. As depicted in FIG. 7 which is a sectional view taken on the line VII—VII in FIG. 6, the metal layer 28 is formed on the transparent base plate 11, using the same material such as Cr, Mo, etc. as that of the light shield 21 (see FIG. 4) and simultaneously with the formation thereof. After this, the insulating layer 22 is formed, followed by the formation of the pixel electrode 15 and the source bus 19 and the formation of the metal layers 29 and 31 as of chromium (Cr), molybdenum (Mo) or the like on the pixel electrode 15 and the source bus 19, and then followed by the formation of the gate insulating film 24.

Figure 8:
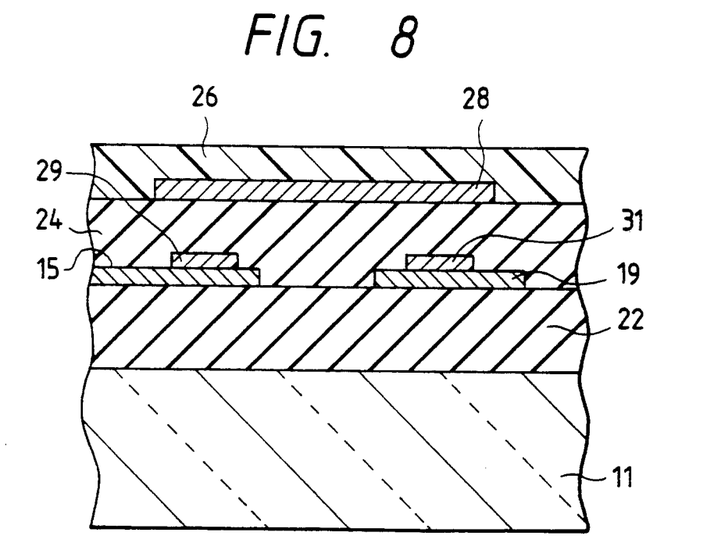
FIG. 8 is a modified sectional view taken on the line VII—VII in FIG. 6.

Alternatively, the metal layers 29 and 31 for welding use may be formed on the pixel electrode 15 and the source bus 19, respectively, and the gate insulating film 24 is deposited all over the base plate 11, covering the metal layers 29 and 31, after which when the gate bus 18 and the gate electrode 25 are formed, the metal layer 28 for shorting use is formed of the same material as that for the gate bus 18 and the gate electrode 25, as shown in FIG. 8. In the examples shown in FIGS. 7 and 8, the source bus 19 may sometimes be formed by depositing a chromium (Cr) or similar metal bus layer on a transparent conductive material layer as of ITO so as to reduce a voltage drop across the source bus 19, and in such a case, the metal layer 29 is formed on the pixel electrode 15 at the same time as the metal bus also serving as the metal layer for weling use is formed on the ITO layer and no metal layer for welding use needs to be provided on the source bus 19 in addition to the metal bus layer.

A white-defect pixel can be seen with the naked eye by driving the liquid crystal display element to produce, for example, a black image over the entire area of its display screen. If an abnormality in the shape of the bus, pixel electrode or TFT adjoining the defective pixel thus found is detected through observation by a microscope, then there is a very strong possibility that the abnormality might have caused the defect. In this instance, the white defect is changed to a black one by treating the defective pixel with the use of the method of the present invention.

Figure 9:
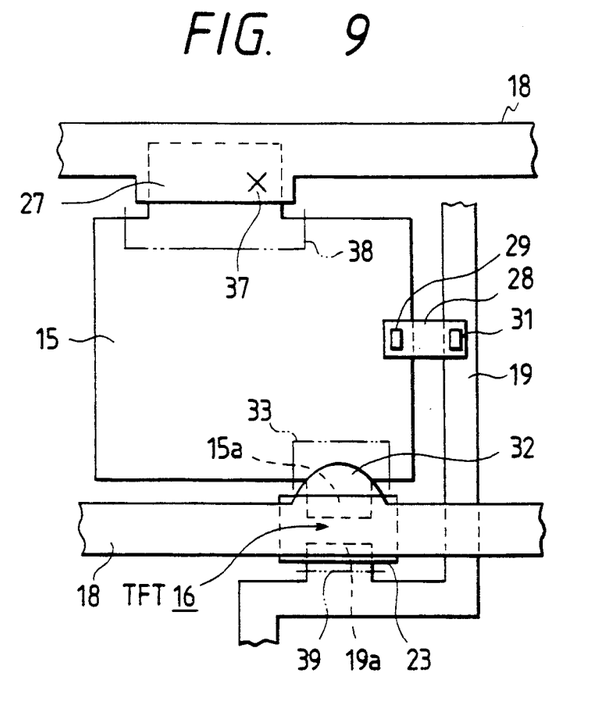
FIG. 9 is a plan view showing an example of a defect and a method for treating it.

For instance, assuming that the gate bus 18 (serving also as the gate electrode) overlying the TFT 16 has a protrusion 32 on the pixel electrode 15 owing to defective patterning as shown in FIG. 9, the capacitive coupling between the gate bus 18 and the pixel electrode 15 becomes nonnegligibly large, making this pixel defective. In this case, the pixel electrode 15 is disconnected from the protrusion 32 by laser trimming from the outside, as indicated by the broken line 33, and then, as depicted in FIG. 7, the overlapping portions of the metal layers for welding use 29 and 31 and the metal layer for shorting use 28 are irradiated by a laser 34 from the outside to fuse these metal layers and destroy the insulating layer 22; thus the metal layer 28 and the metal layers 29 and 31 are shorted with fused metal as indicated by 35 and 36, that is, by laser welding. Consequently, this pixel electrode 15 is connected via the shorted metal layer 28 to the source bus 19. While the liquid crystal element is in use, there is usually a somewhat DC-wise potential difference between the source bus 19 and the common electrode 17 (FIG. 1) and therefore, a voltage will be applied across the liquid crystal between the pixel electrode 15 of the defective pixel and the common electrode 17, resulting in the defective pixel becoming a black defect which always intercepts light.

In the structure shown in FIG. 8, the pixel electrode 15 of a defective pixel can be similarly connected to the source bus 19 via the metal layer for shorting use 28 through laser welding. Also in the case where a pixel is defective owing to a short between the gate electrode (the gate bus 18) and the drain electrode 15a of the TFT 16, they are disconnected from each other along the broken line 33 (when no abnormal protrusion 32 is present, the pixel electrode 15 and the drain electrode 15a are cut off halfway between them). Thus, the pixel electrode 15 is disconnected from the defective portion. The source electrode 19a may also be cut off from the source bus 19 along the broken line 39. Where a short is present between the gate electrode and the source electrode 19a, the latter is cut off along the broken line 39. Moreover, the pixel electrode 15 may also be disconnected from the drain electrode 15a. At any rate, the pixel electrode 15 is connected to the source bus 19 through the shorting metal layer 28 by laser weling.

In the case where a short 37 occurs in the capacitance portion 27 as indicated by a cross in FIG. 9, the capacitance portion 27 is disconnected by laser trimming from the pixel electrode 15 as indicated by the broken line 38 and at the same time the pixel electrode 15 is connected by laser welding to the source bus 19 via the shorting metal layer 28. In this way, various defective pixels can be changed to black defects.

Figure 10:
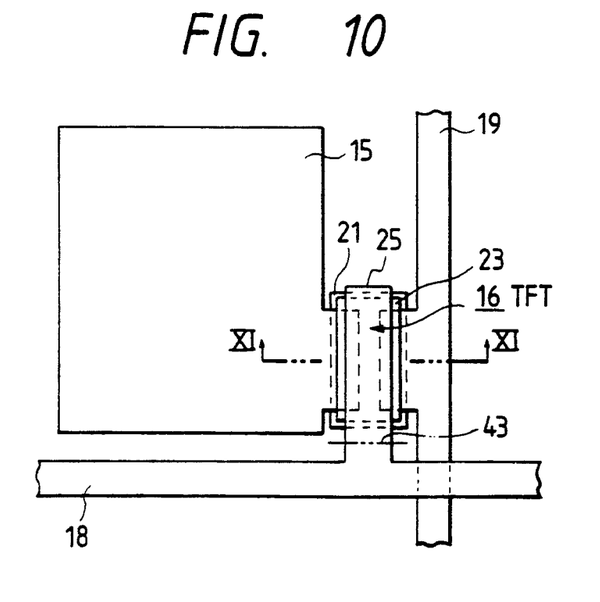
FIG. 10 is a plan view illustrating a portion of a liquid crystal display element employing branched gate electrode type TFT's to which the method of the present invention is applicable.
Figure 11:
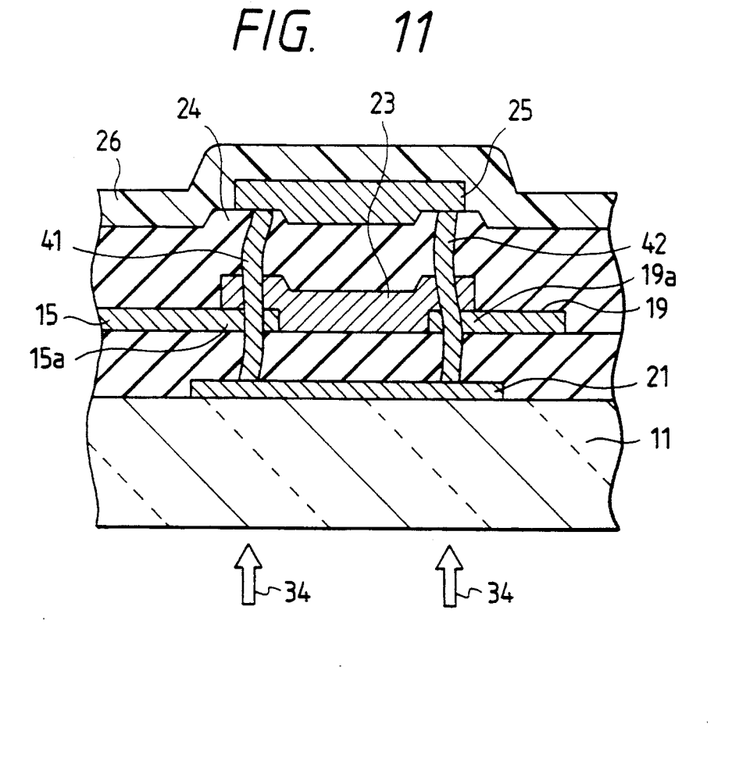
FIG. 11 is a sectional view taken on the line XI—XI in FIG. 10 when the method of the present invention is applied.

In a particular structure of the liquid crystal display element, the pixel electrode of a defective pixel can be connected to the gate bus without specially providing the shorting metal layer 28. In the example depicted in FIG. 6, the gate electrode of the TFT 16 forms a part of the gate bus 18, but in the case where the gate electrode 25 is branched from the gate bus 18 as shown in FIG. 10, the overlapping portions of the drain electrode 15a (a part of the pixel electrode 15) and the source electrode 19a with the light shield 21 and the gate electrode 25 are irradiated by laser beams 34, by which the light shield 21 and the gate electrode 25 are fused, and the drain electrode 15a and the source electrode 19a are shorted to the light shield 21 and the gate electrode 25 by the fused metal as indicated by 41 and 42 in FIG. 11; consequently, the pixel electrode 15 is connected to the source bus 19 via the light shield 21 and the gate electrode 25. In FIG. 11 the gate electrode 25 and or light shield 21 is used also as a shorting metal layer. As indicated by the broken line 43 in FIG. 10, the gate electrode 25 is cut off from the gate bus 18 by laser trimming. In this way, a defective pixel even in the conventional liquid crystal display element can be changed to a black defect.

Figure 12:
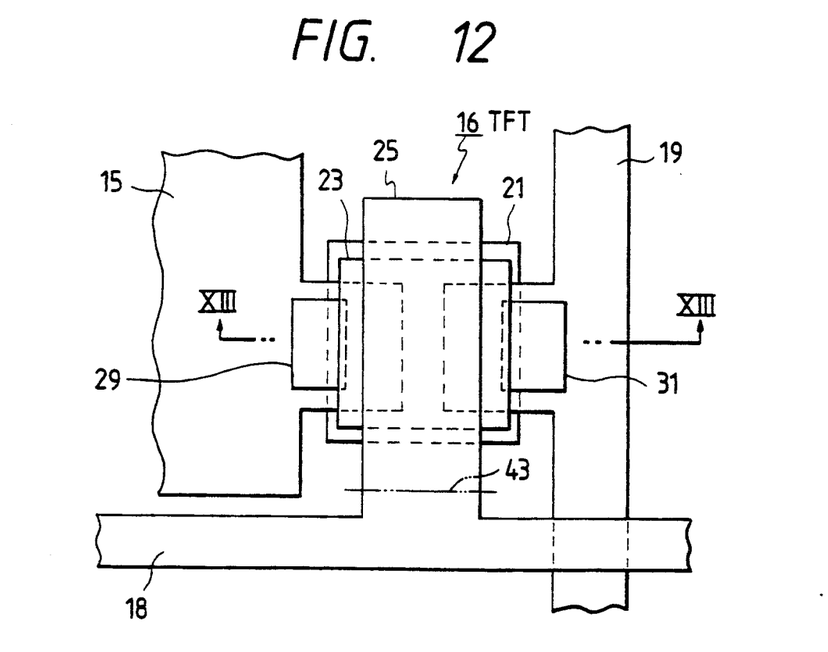
FIG. 12 is a plan view illustrating another embodiment of the present invention.
Figure 13:
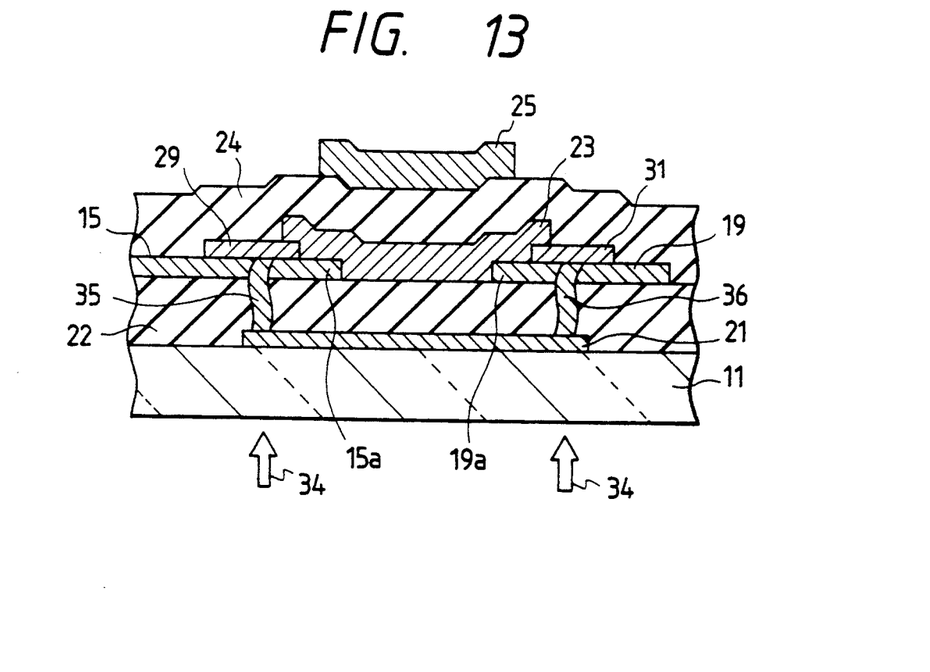
FIG. 13 is a sectional view taken on the line XIII—XIII in FIG. 12.

FIGS. 12 and 13 illustrate another embodiment of the present invention, in which the parts corresponding to those in FIG. 10 and 11 are identified by the same reference numerals. As is the case with the FIG. 10 embodiment, the gate electrode 25 is branched from the gate bus 18. The weld metal layers 29 and 31, which overlap the light shield 21, are formed on the pixel electrode 15 and the source bus 31 in such a manner as not to overlap the gate electrode 25 and not to overlie the marginal portions of the drain electrode 15a and the source electrode 19a. When a defect is found in the pixel electrode 15 or TFT 16, the gate electrode 25 is disconnected by laser trimming from the source bus 18 along the broken line 43 and, as shown in FIG. 13, the overlapping portions of the light shield 21 and the weld metal layers 29 and 31 are irradiated by the laser beams 34, by which the pixel electrode 15 is electrically connected to the source bus 19 through the fused metal layers 35 and 36.

Figure 14:
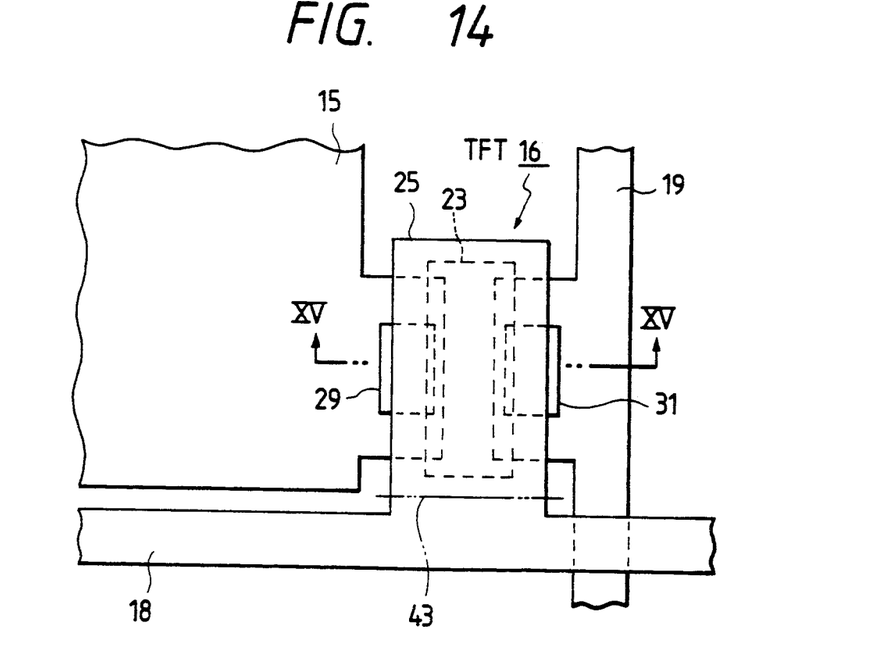
FIG. 14 is a plan view illustrating another embodiment of the present invention.
Figure 15:
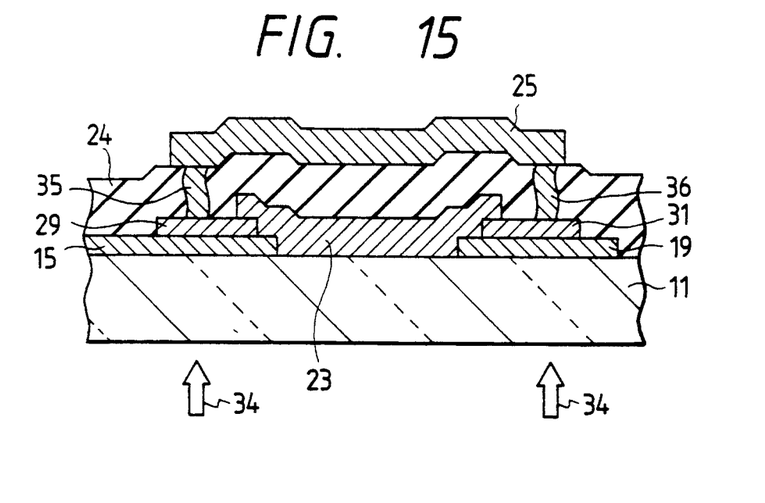
FIG. 15 is a sectional view taken on the line VII—VII in FIG. 14.

FIGS. 14 and 15 illustrate another embodiment of the present invention, in which the parts corresponding to those in FIGS. 10 and 11 are identified by the same reference numerals. Also in this embodiment the gate electrode 25 is branched from the gate bus 18, and as in the case of FIGS. 10 and 11, the weld metal layers 29 and 31 are deposited on the pixel electrode 15 and the source bus 19. In this embodiment the gate electrode 25 is formed overlapping the weld metal layers 29 and 31 and no light shield is provided. When a defect is found in either one of the pixel electrode 15 and the TFT 16, the gate electrode 25 is disconnected by laser trimming from the gate bus 18 along the broken line 43 and the overlapping portions of the gate electrode 25 and the weld metal layers 29 and 31 are irradiated by the laser beams 34, by which the pixel electrode 15 can be connected to the source bus 19 through the fused metal layers 35 and 36.

Figure 16:
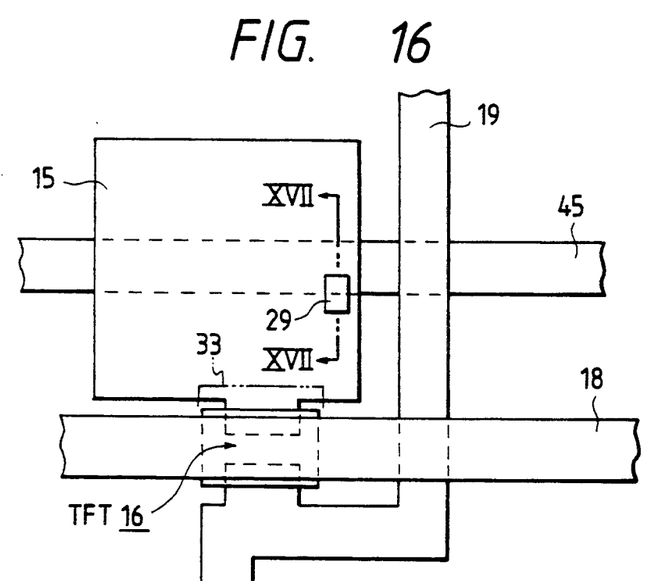
FIG. 16 is a plan view illustrating another embodiment of the present invention.
Figure 17:
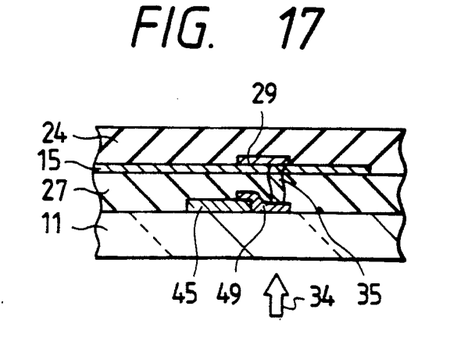
FIG. 17 is sectional view taken on the line XVII—XVII in FIG. 16.

In the above the capacitance 27 is provided through utilization of the gate bus as shown in FIG. 5, but such a capacitance can also be provided as depicted in FIGS. 16 and 17. As shown, a capacitive bus 45 for the capacitance 27 is provided in common to the pixel electrodes 15 of each row in opposing relation to them across an insulating film 44, by which the capacitance 27 between the capacitive bus 45 and each pixel electrode 15 can be added to the capacitance of the latter. Where the capacitive bus 45 is formed of a transparent conductive material such as ITO, the weld metal layer 29 is formed on each pixel electrode 15 and a weld metal layer 49 is formed opposite the weld metal layer 29 and overlapping the capacitive bus 45. By laser welding the weld metal layers 29 and 49 of the pixel electrode 15 of a defective pixel, the pixel electrode 15 is connected to the capacitive bus 45 through the fused metal layer 35. By holding the capacitive bus 45 at a potential different from that of the common electrode 17, the defective pixel can be changed to a black defect. Where the capacitive bus 45 is formed of metal, the weld metal layer 49 can be omitted.

While the present invention has been described as being applied to the liquid crystal display element employing a top gate type TFT wherein the gate electrode 25 is disposed on the opposite side from the transparent base plate 11 with respect to the semiconductor layer 23, the invention is also applicable to the liquid crystal display element employing a bottom gate type TFT wherein the gate electrode 25 is disposed on the side of the transparent base plate 11.

As described above, according to the present invention, a defective pixel in the normally white mode liquid crystal display element can be changed to a black defect—this improves the display as compared with that in the prior art and hence raises the yield of the liquid crystal display element.

What is claimed is:

1. A liquid crystal display element which operates in a normally white mode and wherein a plurality of source buses and a plurality of gate buses are arranged in rows and columns at right angles to each other on the inside of a first transparent base plate, pixel electrodes are each disposed in an area defined by said source and gate buses and connected via a thin film transistor to a pair of adjoining ones of said source and gate buses, and a common electrode is formed substantially all over the inside of a second transparent base plate in opposed relation to said pixel electrodes, liquid crystal being interposed between said base plates, said liquid crystal display element including:
    a shorting metal layer formed in a manner to overlap a marginal portion of each of said pixel electrodes and a portion of an adjoining one of said source buses with an insulating layer being interposed therebetween; and
    a fused metal portion formed by laser welding through said insulating layer between said overlapping portions of each defective pixel and the adjoining one of said source buses, said pixel electrode of said each defective pixel being electrically connected to said source bus through said fused metal portion.

2. The liquid crystal display element of claim 1, wherein said pixel electrodes and said source buses are formed by transparent conductive layers, and which further includes a first weld metal layer formed on said overlapping portion of said each pixel electrode and a second weld metal layer formed on said overlapping portion of said adjoining source bus.

3. The liquid crystal display element of claim 2, wherein said shorting metal layer is formed between said first transparent base plate and said insulating layer and said each pixel electrode and said each source bus are formed on said insulating layer.

4. The liquid crystal display element of claim 2, wherein said shorting metal layer is formed on said insulating layer, and said each pixel electrode and said each source bus are formed under said insulating layer.

5. The liquid crystal display element of claim 3 or 4, wherein a metal bus is formed along each of said source buses in contact therewith, and said second weld metal layer is a part of the metal bus.

6. The liquid crystal display element of claim 2, wherein said shorting metal layer is formed apart from said thin film transistor.

7. The liquid crystal display element of claim 6, wherein said thin film transistor is formed at a position where it overlaps the corresponding gate bus so that it uses the overlapping portion as a gate electrode.

8. The liquid crystal display element of claim 3, wherein each said thin film transistor has a gate electrode branched from the corresponding gate bus, said first and second weld metal layers are formed on a source electrode and a drain electrode of said thin film transistor extended from marginal edges of said pixel electrode and said source bus toward each other, and said shorting metal layer is formed in a manner to overlap a semiconductor layer of said thin film transistor and said first and second weld metal layers, said shorting metal layer serving also as a light shield layer for said thin film transistor.

9. The liquid crystal display element of claim 4, wherein each said thin film transistor has a gate electrode branched from the corresponding gate bus, said first and second weld metal layers are formed on a source electrode and a drain electrode of said thin film transistor extended from marginal edges of said pixel electrode and said gate bus toward each other, said insulating layer constitutes a gate insulating film of said thin film transistor, and said gate electrode is formed in a manner to overlap said first and second weld metal layers.

10. The liquid crystal display element of claim 1, wherein each of said pixel electrodes and each of said source buses are formed by transparent conductive layers on said insulating layer, said one portion of said pixel electrode and said one portion of said source bus respectively constitute a drain electrode and a source electrode of said thin film transistor, said shorting metal layer is formed under said insulating layer, said shorting metal layer serving also as a light shield layer for said thin film transistor, and said gate electrode is formed in a manner to overlap said one portion of said pixel electrode and said one portion of said source bus.

11. A liquid crystal display element which operates in a normally white mode and wherein a plurality of source buses and a plurality of gate buses are arranged in rows and columns at right angles to each other on the inside of a first transparent base plate, pixel electrodes are each disposed in an area defined by said source and gate buses and connected via a thin film transistor to a pair of adjoining ones of said source and gate buses, and a common electrode is formed substantially all over the inside of a second transparent base plate in opposed relation to said pixel electrodes with liquid crystal interposed therebetween, each of said pixel electrodes being formed by a transparent conductive layer on an insulating layer, together with the corresponding one of said source buses, said liquid crystal display element including:
    a capacitive bus formed in a manner to overlap said pixel electrodes of each row with said insulating layer interposed therebetween;
    a first weld metal layer formed opposite said pixel electrode with said insulating layer interposed therebetween, said first weld metal layer being connected to said capacitive bus;
    a second weld metal layer overlapping said first weld metal layer with said insulating layer interposed therebetween, at least one portion of said second weld metal layer being formed directly on said pixel electrode; and
    a fused metal portion formed by laser welding on said overlapping portion of each defective pixel, for connecting said pixel electrode of said defective pixel to said capacitive bus capacitance.

12. The liquid crystal display element of claim 11, wherein said capacitive bus is formed by a transparent conductive layer and said first weld metal layer overlaps said capacitive bus.

13. The liquid crystal display element of claim 11, wherein said capacitive bus is formed by a metal bus layer and said first weld metal layer is defined as a part of said metal bus layer.

14. A method for disposing of a defective pixel in a liquid crystal display element which operates in a normally white mode and wherein a plurality of parallel source buses and a plurality of parallel gate buses are arranged in rows and columns at right angles to each other on the inside of a first transparent base plate, pixel electrodes are each disposed in an area defined by said source and gate buses and connected via a thin film transistor to a pair of adjoining ones of said source and gate buses, and a common electrode is formed substantially all over the inside of a second transparent base plate in opposed relation to said pixel electrodes with liquid crystal interposed therebetween, said method including:

welding, by irradiation with laser beams from the outside, those portions of a shorting metal layer which overlap a marginal portion of said pixel electrode and an adjoining one of said source buses with an insulating layer interposed therebetween, to connect said pixel electrode of each defective pixel to the corresponding one of said source buses which is to be supplied with a potential different from that applied to said common electrode, whereby the nature of the defect of said defective pixel is changed.

15. The method of claim 14, including a step wherein said pixel electrode of said each defective pixel and said thin film transistor corresponding thereto are cut off from each other by laser trimming.

16. The method of claim 14, including a step wherein said thin film transistor of said each defective pixel and said source bus corresponding thereto are cut off from each other by laser trimming.

17. The method of claim 14, including a step wherein a gate electrode of said thin film transistor of said each defective pixel, branched from said gate bus corresponding thereto, is cut off by laser trimming from said gate bus corresponding to said gate electrode.

* * * * *